United States Patent
Gan et al.

(10) Patent No.: US 9,626,579 B2
(45) Date of Patent: Apr. 18, 2017

(54) INCREASING CANNY FILTER IMPLEMENTATION SPEED

(71) Applicant: QUALCOMM Incorporated, San Diego, CA (US)

(72) Inventors: Kim-Chyan Gan, Sammamish, WA (US); Mao Zeng, Austin, TX (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 14/269,380

(22) Filed: May 5, 2014

(65) Prior Publication Data

US 2015/0317532 A1    Nov. 5, 2015

(51) Int. Cl.
G06K 9/48    (2006.01)
G06K 9/46    (2006.01)
G06T 1/20    (2006.01)

(52) U.S. Cl.
CPC .............. *G06K 9/46* (2013.01); *G06K 9/4604* (2013.01); *G06T 1/20* (2013.01)

(58) Field of Classification Search
CPC .................................. G06K 9/4604; G06T 1/20
USPC ....................................................... 382/199
See application file for complete search history.

(56) References Cited

U.S. PATENT DOCUMENTS

| | | | |
|---|---|---|---|
| 5,379,350 A * | 1/1995 | Shimazu | G06T 7/0085 382/197 |
| 8,213,741 B2 | 7/2012 | Sundareson et al. | |
| 2011/0085736 A1 * | 4/2011 | Dmitriev | G06T 17/20 382/199 |
| 2012/0141015 A1 | 6/2012 | Yu et al. | |
| 2012/0250974 A1 | 10/2012 | Miyamoto | |
| 2013/0057700 A1 * | 3/2013 | Yi | G06T 7/2046 348/169 |
| 2013/0155235 A1 | 6/2013 | Clough et al. | |

OTHER PUBLICATIONS

Lourenco et al. "Efficient implementation of Canny Edge Detection Filter for ITK using CUDA", IEEE 2012, pp. 33-40.*
09gr820 "Canny Edge detection", Mar. 23, 2009, pp. 1-7.*
Rao et al. "Implementation and Evaluation of Image Processing Algorithms on Reconfigurable Architecture Using C-based Hardware Descriptive Languages" International Journal of Theoretical and Applied Computer Sciences, vol. 1 No. 1, 2006 pp. 9-34.*
Namdev Sawant et al. "Performance Evaluation of Feature Extraction Algorithm on GPGPU", IEEE Communication Systems and Network Technologies (CSNT), 2011 International Conference on Jun. 3-5, 2011, pp. 536-540.*
Canny, J., "A Computational Approach to Edge Detection," IEEE Transactions on Pattern Analysis and Machine Intelligence, Nov. 1986, vol. PAMI-8, No. 6, IEEE, Piscataway, NJ, pp. 679-698.
"Canny Edge Detector", Wikipedia, the free encyclopedia, Retrieved from <<https://en.wikipedia.org/wiki/Canny_edge_detector>>, Retrieved on Feb. 19, 2016, Wikimedia Foundation, San Francisco, CA, 9 Pages.

* cited by examiner

*Primary Examiner* — Samir Ahmed
(74) *Attorney, Agent, or Firm* — Toler Law Group, PC

(57) ABSTRACT

A method includes receiving image data and performing a non-maximum suppression (NMS) operation on the image data. The method also includes initiating an edge tracking by hysteresis (ETH) operation on a portion of the image data prior to completion of the NMS operation.

20 Claims, 6 Drawing Sheets

INCREASING CANNY FILTER IMPLEMENTATION SPEED

I. FIELD

The present disclosure is generally related to increasing Canny Filter implementation speed.

II. DESCRIPTION OF RELATED ART

Advances in technology have resulted in smaller and more powerful computing devices. For example, there currently exist a variety of portable personal computing devices, including wireless computing devices, such as portable wireless telephones, tablets, and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Image processors within wireless telephones may use edge detection algorithms to detect objects in digital images. Edge detection is a useful operation in computer vision. For example, edge detection may enable an image processor to determine object boundaries in a digital image. One edge detection algorithm commonly used by the image processors is the Canny Filter. Canny Filter is an edge detection algorithm that includes a gradient computation (GC) operation, a non-maximum suppression (NMS) operation, and an edge tracking by hysteresis (ETH) operation. Each operation is completed before a subsequent operation is initiated. For example, the GC operation is performed on an entire image before the NMS operation is initiated. Additionally, an image processor may execute multiple branched instructions during the GC operation, which may increase processing time. As a result, edge detection processing using the Canny Filter may be subject to relatively long processing times.

III. SUMMARY

Systems and methods to increase Canny Filter implementation speed are disclosed. Canny Filter is an edge detection algorithm that includes a gradient computation (GC) operation, a non-maximum suppression (NMS) operation, and an edge tracking by hysteresis (ETH) operation. Performing the GC operation on image data may include applying a Gaussian Filter (e.g., a blurring operation) to image data to reduce noise and determining a gradient of the image data based on an output of the blurring operation. An image processor may execute branchless instructions to perform the GC operation to decrease processing time (e.g., increase Canny Filter implementation speed). In a particular aspect, the GC operation may determine a gradient direction of a particular pixel.

Performing an NMS operation on the image data may include determining whether the particular pixel is a local maximum (e.g., a strong edge candidate). For example, based on an angle (e.g., a gradient direction) associated with the particular pixel, the image processor may determine whether a gradient magnitude of neighboring pixels is higher than the gradient magnitude of the particular pixel. Data regarding a first set of neighboring pixels (e.g., pixels in a positive direction of the particular pixel) may be stored in a first vector register, and data regarding a second set of neighboring pixels (e.g., pixels in a negative direction of the particular pixel) may be stored in a second vector register. Storing the first set of neighboring pixels in the first vector register and the second set of neighboring pixels in the second register may enable the image processor to perform multiple compare operations and "mux" operations in parallel to decrease processing time associated with the NMS operations. If the gradient magnitude of the particular pixel is higher than the gradient magnitude of its neighboring pixels, then the particular pixel may be determined to be a strong edge candidate.

Performing an ETH operation includes scanning through each pixel for strong edge candidates and marking each strong edge candidate as an "edge." The ETH operation may be initiated prior to completion of the NMS operation. For example, a row buffer may generate an indicator signal (e.g., "rowsync") to indicate that the NMS operation is completed for a first row of pixels. Before the ETH is performed on the first row of pixels, the image processor checks whether the first row of pixels has undergone the NMS operation. After the first row of pixels has undergone the NMS operation, the image processor may perform ETH on the first row of pixels while the NMS operation is performed on a second row of pixels. For example, the image processor may perform an edge tracking operation on strong edge candidates on a pixel-by-pixel basis. Thus, the image processor may reduce waiting (e.g., polling) by performing ETH upon completion of the NMS operation row-by-row as opposed to waiting until after the entire image has undergone the NMS operation.

In a particular aspect, a method includes receiving image data and performing a non-maximum suppression (NMS) operation on the image data. The method also includes initiating an edge tracking by hysteresis (ETH) operation on a portion of the image data prior to completion of the NMS operation.

In another particular aspect, an apparatus includes an image processor and a memory storing instructions that are executable by the image processor to perform operations. The operations include receiving image data and performing a non-maximum suppression (NMS) operation on the image data. The operations also include initiating an edge tracking by hysteresis (ETH) operation on a portion of the image data prior to completion of the NMS operation.

In another particular aspect, a non-transitory computer-readable medium includes instructions that, when executed by an image processor, cause the image processor to receive image data and perform a non-maximum suppression (NMS) operation on the image data. The instructions are also executable to cause the image processor to initiate an edge tracking by hysteresis (ETH) operation on a portion of the image data prior to completion of the NMS operation.

One particular advantage provided by at least one of the disclosed aspects is an ability to decrease Canny Filter processing times. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
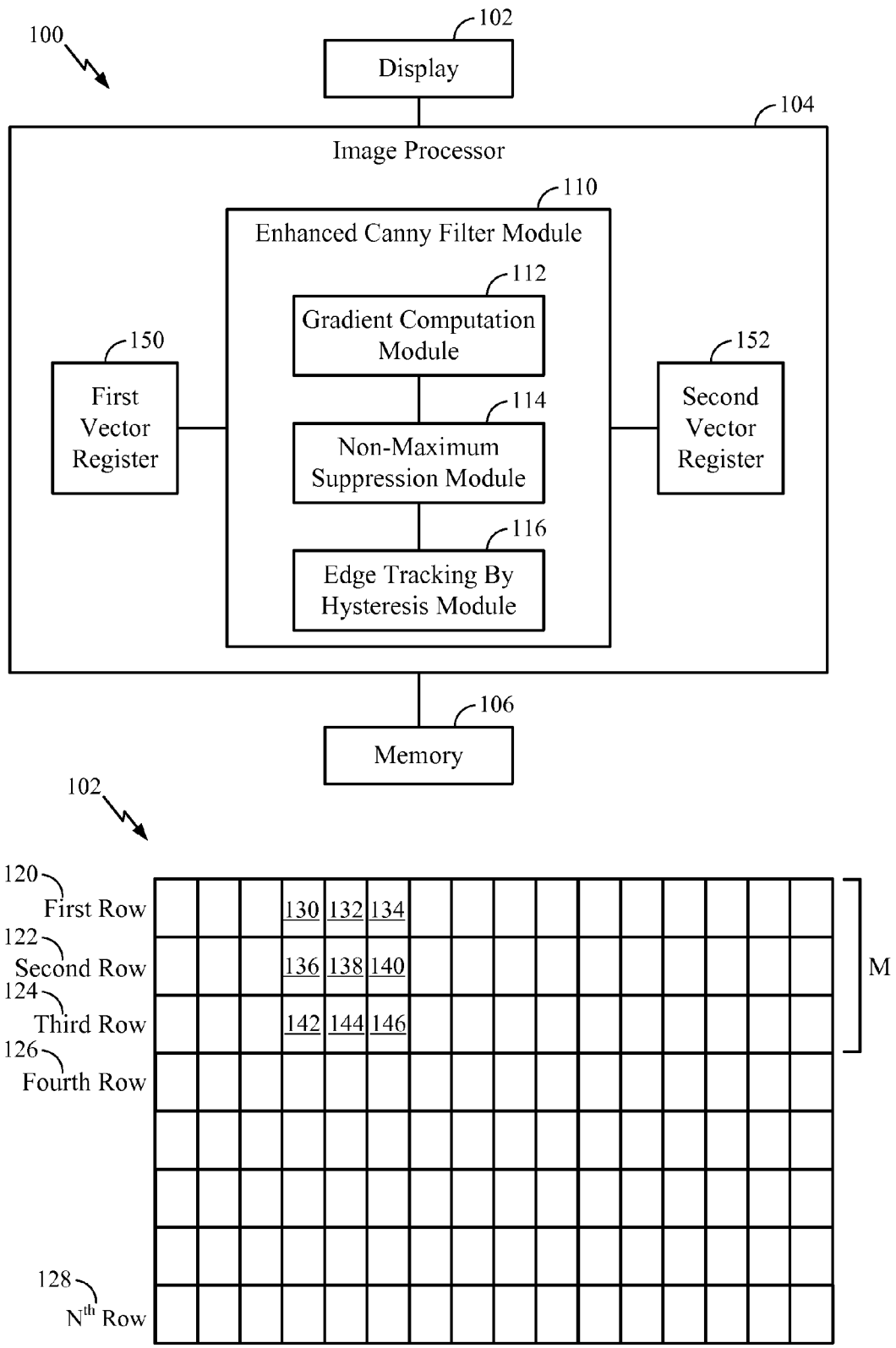
FIG. 1 is a diagram of a particular illustrative aspect of a system that is operable to increase Canny Filter implementation speed.

Referring to FIG. 1, a particular illustrative aspect of a system 100 that is operable to increase Canny Filter implementation speed is shown. The system 100 includes a display 102, an image processor 104, and a memory 106. The display 102 may be coupled to the image processor 104 such that the image processor 104 may generate image data based on images associated with the display 102. The image data may correspond to data associated with a frame of a video file or data associated with a still image. The memory 106 may also be coupled to the image processor 104. The image processor 104 may include an enhanced Canny Filter module 110. The enhanced Canny Filter module 110 may include a gradient computation (GC) module 112, a non-maximum suppression (NMS) module 114, and an edge tracking by hysteresis (ETH) module 116. Each module 110-116 may correspond to hardware components of the image processor 104, software instructions that are executable by the image processor 104, or a combination thereof.

The display 102 may depict an image. In the illustrated aspect, the display 102 includes one-hundred twenty-eight (128) pixels (e.g., 16-pixels×8-pixels). However, the pixel dimension of the display 102 is for illustrative purposes only and should not be construed as limiting. In a particular aspect, the display 102 may be a 20 megapixel display, a 15 megapixel display, etc.

In the illustrated aspect, the display 102 includes N rows of pixels, where N is any integer value that is greater than zero. For example, the display 102 may include a first row 120 of pixels, a second row 122 of pixels, a third row 124 of pixels, a fourth row 126 of pixels, and an Nth row 128 of pixels. As a non-limiting example, if N is equal to 15, the display 102 may include 15 rows of pixels.

The GC module 112 may be configured to determine a gradient for the image (e.g., frame) in the display 102. For example, the GC module 112 may apply a blurring operation to the image on a pixel-by-pixel basis or on a line-by-line basis. In a particular aspect, the blurring operation may correspond to a Gaussian Filter. For example, GC module 112 may apply a Gaussian Filter to a particular line of an image and compute the gradient of the particular line. During a line-by-line computation, the GC module 112 may apply the Gaussian Filter to the first row 120 of pixels, compute the gradient of the first row 120 of pixels, apply the Gaussian Filter to the second row 122 of pixels, compute the gradient of the second row 122 of pixels, etc. During a pixel-by-pixel computation, the GC module 112 may apply the Gaussian Filter to a particular pixel in the first row 120 of pixels, compute the gradient of the particular pixel, apply the Gaussian Filter to a "next" pixel in the first row 120 of pixels, compute the gradient of the next pixel, etc.

The GC module 112 may use the output of the blurring operation (e.g., the output of the Gaussian Filter) to compute derivatives of the image in an x-direction $D_x(x,y)$ and a y-direction $D_y(x,y)$. A magnitude square of the gradient $M^2(x,y)$ is equal to the sum of the square of the x-direction derivative and the square of the y-direction derivative (e.g., $M^2(x,y)=D^2_x(x,y)+D^2_y(x,y)$). In a particular aspect, an angle ($\theta$) of the gradient may be computed and quantized into one of five possible directions. For example, the angle ($\theta$) of the gradient may be computed using an inverse tangent (arctan) function of the quotient of the y-direction derivative and the x-direction derivative (e.g., $\theta(x,y)=arctan([D_y(x,y)]/[D_x(x,y)])$).

The GC module 112 may quantize the angle ($\theta$) of the gradient into a first direction (e.g., dir[idx]=0) if $D_x(x,y)=0$ and $D_y(x,y)=0$, where dir[idx] is the direction of the quantized angle ($\theta$). The GC module 112 may quantize the angle ($\theta$) of the gradient into a second direction (e.g., dir[idx]=0X1) if the angle $\theta(x,y)$ is between 0 degrees and 22.5 degrees or if the angle $\theta(x,y)$ is between 157.5 degrees and 180 degrees. The GC module 112 may quantize the angle ($\theta$) of the gradient into a third direction (e.g., dir[idx]=0X2) if the angle $\theta(x,y)$ is between 67.5 degrees and 112.5 degrees. The GC module 112 may quantize the angle ($\theta$) of the gradient into a fourth direction (e.g., dir[idx]=0X3) if the angle $\theta(x,y)$ is between 112.5 degrees and 157.5 degrees, and the GC module 112 may quantize the angle ($\theta$) of the gradient into a fifth direction (e.g., dir[idx]=0X4) if the angle $\theta(x,y)$ is between 22.5 degrees and 67.5 degrees.

The GC module 112 may use branchless instructions to perform the gradient computation operation described above. For example, the GC module 112 may first determine whether the angle $\theta(x,y)$ is 45 degrees or 135 degrees using an exclusive-OR (^) computation (e.g., $(D_x \char`\^ D_y)>=0$). Secondly, the GC module 112 may determine whether the angle $\theta(x,y)$ is zero degrees using absolute value (abs) computations (e.g., $abs(D_x)>2*abs(D_y)$), and the GC module 112 may also determine whether the angle $\theta(x,y)$ is 90 degrees using absolute value computations (e.g., $abs(D_y)>2*abs(D_x)$). Finally, the GC module 112 may determine whether the angle $\theta(x,y)$ is directionless (e.g., whether there is no determinable gradient direction) based on a determination that the x-direction $D_x(x,y)$ derivative and the y-direction $D_y(x,y)$ derivative are equal to zero (e.g., $(D_x | D_y)==0$).

The branchless instructions executable by the GC module 112 to determine the angle $\theta(x,y)$ may operate in accordance with the following pseudo-code:

```
{
if ( (Dx ^ Dy) >= 0)
    dir[idx] = 0X3;
else
    dir[idx]=0X4;
if ( abs(Dx) > 2*abs(Dy))
    dir[idx]=0X1;
if ( abs(Dy) > 2*abs(Dx))
    dir[idx]=0X2;
if ( (Dx | Dy) ==0);
    dir[idx]==0;}
}
```

It should be noted that although certain expressions as set forth herein use a syntax similar to the C or C++ programming language, the expressions are for illustrative purposes and may instead be expressed in other programming languages with different syntax.

When computing the quantized angle θ(x,y) according to above pseudo-code, there is no branching (e.g., "else if" clauses) because later computations may override earlier computations. For example, regardless of the value of the quantized angle θ(x,y) after the initial computations, if the third step determines that $D_x$ and $D_y$ are equal to zero, the GC module 112 may override the previous computations. Thus, the algorithm may include four compare (e.g., "if") operations and four multiplexing "mux" operations. It will be appreciated that the compare operations may be performed simultaneously to reduce processing time.

The GC module 112 may track the maximum gradient of the image (e.g., the pixel with the greatest gradient magnitude (M)) depicted in the display 102. The maximum gradient may be used to normalize a high threshold ($T_{high}$) and a low threshold ($T_{low}$) during NMS operations, as described below.

Referring to the display 102 depicted in FIG. 1, the first row 120 of pixels may include a first pixel 130, a second pixel 132, and a third pixel 134. The second row 122 of pixels may include a fourth pixel 136, a fifth pixel 138, and a sixth pixel 140. The third row 124 of pixels may include a seventh pixel 142, an eighth pixel 144, and a ninth pixel 146. The GC module 112 may perform a gradient computation operation on each pixel 130-144 to determine a gradient direction (e.g., the angle (θ)) of each pixel 130-144. After determining the gradient direction of the fifth pixel 138 and its neighboring pixels, the GC module 112 may store a first set of neighbor pixels of the fifth pixel 138 in a first vector register 150 and a second set of neighbor pixels of the fifth pixel 138 in a second vector register 152.

The first set of neighbor pixels may include positive neighbors. Positive neighbors may correspond to pixels to the right of the fifth pixel 138 and/or pixels below the fifth pixel 138 (e.g., pixels that undergo gradient computation operations after the fifth pixel 138). For example, the sixth pixel 140, the seventh pixel 142, the eighth pixel 144, and the ninth pixel 146 may be positive neighbors of the fifth pixel 138. The second set of neighbor pixels may include negative neighbors. Negative neighbors may correspond to pixels to the left of the fifth pixel 138 and/or pixels above the fifth pixel 138 (e.g., pixels that undergo gradient computation operations before the fifth pixel 138). For example, the first pixel 130, the second pixel 132, the third pixel 134, and the fourth pixel 136 may be negative neighbors of the fifth pixel 138.

The NMS module 114 may perform a NMS operation on a particular pixel to determine whether the particular pixel is a strong edge candidate (e.g., a pixel with a relatively high probability of being part of an edge of an object in an image) or a weak edge candidate (e.g., a pixel with a lower probability of being part of an edge of an object in an image). The determination of whether the particular pixel is a strong edge candidate or a weak edge candidate depends on the gradient of the particular pixel and the gradient of neighboring pixels.

For example, the NMS module 114 may determine whether the fifth pixel 138 is a local maximum based on the direction (e.g., the angle θ(x,y)) found in the gradient computation of the fifth pixel 138 and based on the gradients of a particular set of neighboring pixels. If the gradient direction associated with the fifth pixel 138 corresponds to the second direction (dir[idx]=0X1) where the angle θ(x,y) is between 0 degrees and 22.5 degrees, the determination of whether the fifth pixel 138 is a local maximum may be based on the fourth pixel 136 (e.g., the negative neighbor in the second direction) and the sixth pixel 140 (e.g., the positive neighbor in the second direction). If the gradient direction associated with the fifth pixel 138 corresponds to the third direction (dir[idx]=0X2) where the angle θ(x,y) is between 67.5 degrees and 112.5 degrees, the determination of whether the fifth pixel 138 is a local maximum may be based on the second pixel 132 (e.g., the negative neighbor in the third direction) and the eighth pixel 144 (e.g., the positive neighbor in the third direction). Determinations with respect to the fifth pixel 138 being a local maximum may be made with respect to the fourth direction (e.g., dir[idx]=0X3) or the fifth direction (e.g., dir[idx]=0X4) in a substantially similar manner.

Figure 2:
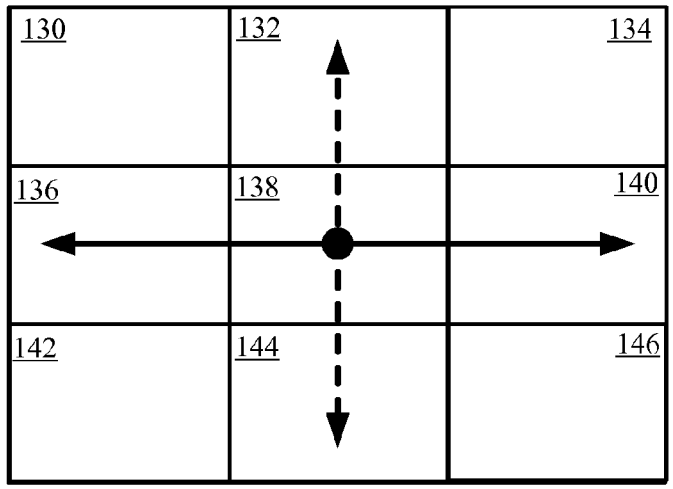
FIG. 2 is a diagram of a particular aspect of a gradient direction determined using branchless gradient computation (GC) instructions.

The NMS module 114 may determine that the fifth pixel 138 is a local maximum if the gradient of the fifth pixel is higher than both of the neighboring pixels. Referring to FIG. 2, for ease of illustration, the NMS operation will be described on the premise that the gradient direction associated with the fifth pixel corresponds to the second direction (dir[idx]=0X1) and the fourth and sixth pixels 136, 140 are the neighbor pixels. In FIG. 2, the second direction (dir[idx]=0X1) is represented by a solid black arrow. Similar techniques may be used to perform the NMS operation with respect to other gradient directions.

The NMS module 114 may compare the gradient magnitude of the fifth pixel 138 to the gradient magnitude of the fourth pixel 136 (e.g., a negative neighbor pixel) and to the gradient magnitude of the sixth pixel 140 (e.g. a positive neighbor pixel) to determine whether the fifth pixel 138 is a local maximum. For example, if the magnitude (M) of the gradient of the fifth pixel 138 is greater than the magnitude (M) of the gradient of the fourth pixel 136 and the magnitude (M) of the gradient of the sixth pixel 140, the fifth pixel 138 is a local maximum. The NMS module 114 may also compare the gradient of the fifth pixel 138 to the high threshold ($T_{high}$) and to the low threshold ($T_{low}$), as described above, to determine whether the fifth pixel 138 is a strong edge candidate or a weak edge candidate. For example, if the magnitude (M) of the gradient of the fifth pixel 138 is greater than the high threshold ($T_{high}$) and the fifth pixel 138 is a local maximum, the NMS module 114 may determine that the fifth pixel 138 is a strong edge candidate. The NMS module 114 may determine that the fifth pixel 138 is a weak edge candidate if the fifth pixel 138 is a local maximum and has a gradient between the high threshold ($T_{high}$) and the low threshold ($T_{low}$).

Figure 3:
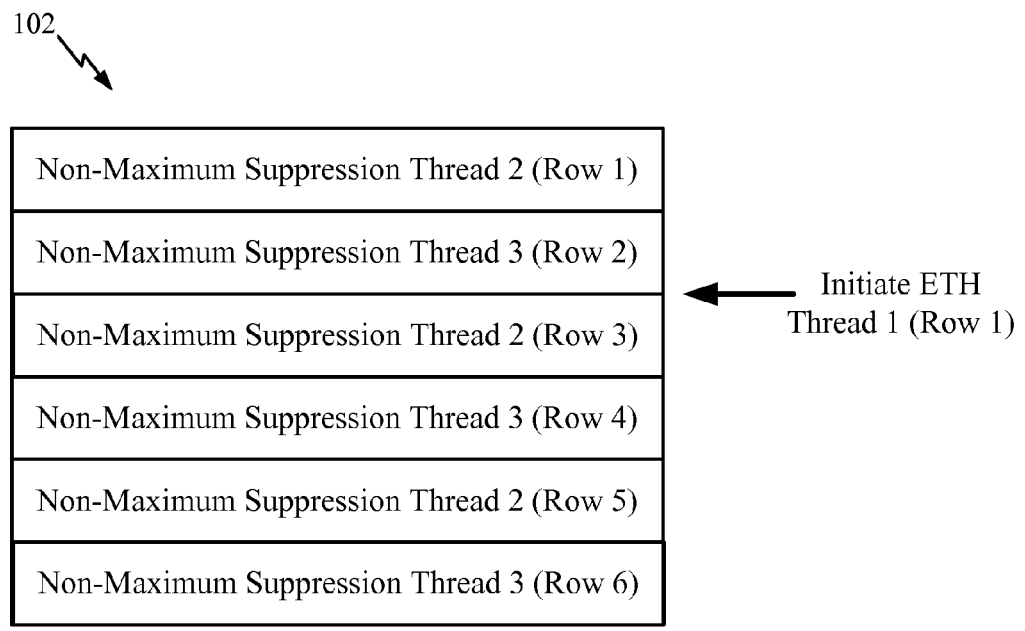
FIG. 3 is a diagram of a particular illustrative aspect of an image in a display that is processed by non-maximum suppression (NMS) through interleaved data partition.

In a particular aspect, the NMS module 114 may perform NMS operations in an interleaved manner. As illustrated in FIG. 3, the NMS module 114 may perform NMS operations in a second thread (Thread 2) (e.g., execution thread of a processor). The second thread may perform NMS operation on particular rows (e.g., odd numbered rows) of pixels that are distributed across the display 102. For example, the second thread may perform NMS operations (e.g., determine whether a pixel is a strong edge candidate) on pixels in the first row 120 of pixels, the third row 124 of pixels, a fifth row of pixels, etc. The NMS module 114 may also perform NMS operations in a third thread (Thread 3). The third thread may perform NMS operations on other rows (e.g., even numbered rows) of pixels that are distributed across the display 102. For example, the third thread may perform NMS operations (e.g., determine whether a pixel is a strong edge candidate) on pixels in the second row 122 of pixels, the fourth row 126 of pixels, a sixth row of pixels, etc. In a particular aspect, the NMS module 114 may operate as a simultaneous multi-threaded (SMT) processing element such that the second thread and the third thread are executed concurrently.

A first thread (Thread 1) may initiate ETH operations prior to the second thread and the third thread completing NMS operations. As described below, ETH operations may include scanning pixels that have undergone NMS processing to identify and perform edge tracking on strong edge candidates on a pixel-by-pixel basis. The first thread may initiate ETH operations on pixels in the first row 120 of pixels after the second and third threads perform NMS operations on the first and second rows 120, 122 of pixels, respectively. Performing the NMS operation in an interleaved manner (e.g., according to an interleaved data partition pattern) may reduce polling associated with ETH operations, and thus may reduce processing times. Instead of the second thread performing an NMS operation on an upper half of an image and the third thread performing an NMS operation on a lower half of the image, each thread may process a "block height" (e.g., perform NMS operations on a particular number of rows) in an interleaved fashion, as illustrated in FIG. 3. For example, the rows of pixels that undergo NMS operations by the second thread may be interleaved with the rows of pixels that undergo NMS operations by the third thread. Performing the NMS operation according to the interleaved data partition pattern illustrated in FIG. 3 may increase Canny Filter implementation speed (e.g., reduce the number of clock cycles to perform edge detection via the Canny Filter). For example, the first thread may initiate ETH operations on the first row 120 of pixels and continue ETH operations on subsequent rows of pixels with reduced polling (e.g., waiting associated with completion of NMS operations on the subsequent rows of pixels) because multiple threads are concurrently performing NMS operations on pixels in the upper half of the image in an interleaved manner (as opposed to a single thread performing NMS operations on pixels in the upper half of the image).

Processing time may be reduced during NMS operations by storing each set of neighboring pixels in vector registers (e.g., the first vector register 150 and the second vector register 152). For example, because there are four potential neighbor candidates, four compare operations may be performed and eight "mux" operations (e.g., for the negative and positive neighbors) may be performed to determine whether the fifth pixel 138 is a strong edge candidate or a weak edge candidate. Storing each set of neighboring pixels in the vector registers enables the NMS module 114 to partition the pixels into two categories and to perform parallel compare operations, parallel "mux" operations, or any combination thereof.

The ETH module 116 may be configured to perform a scanning operation on a group of pixels in the display 102 to determine if a particular pixel in the group of pixels is a strong edge candidate. The group of pixels may include two pixels, four pixels, eight pixels, etc. If the ETH module 116 determines that a particular pixel in the group of pixels is a strong edge candidate, the ETH module 116 marks the particular pixel as an edge and traces along the negative and positive direction (e.g., the directions perpendicular to the gradient flow of the particular pixel) for a weak edge candidate. If the ETH module 116 determines that there are no strong edge candidates in the group of pixels, the ETH module 116 may perform a scanning operation on a different group of pixels in the display 102.

As an illustrative non-limiting example, the ETH module 116 may use a four pixel kernel to scan the fifth pixel 138, the sixth pixel 140, the eighth pixel 144, and the ninth pixel 146. In response to scanning the pixels, the ETH module 116 may determine that the fifth pixel 138 is a strong edge candidate from the NMS operation. If the gradient of the fifth pixel 138 is flowing in the second direction (dir[idx] =0X1) as illustrated by the solid arrow in FIG. 2, the ETH module 116 may determine whether the pixels perpendicular to the gradient flow of the fifth pixel 138 are weak edge candidates. In FIG. 2, the direction perpendicular to the gradient flow of the fifth pixel 138 is depicted by a dotted arrow. For example, the ETH module 116 may determine whether the second pixel 132 (e.g., the pixel perpendicular to the gradient flow in the negative direction) is a weak edge candidate based on the NMS operation, and the ETH module 116 may determine whether the eighth pixel 144 (e.g., the pixel perpendicular to the gradient flow in the positive direction) is a weak edge candidate based on the NMS operation.

In response to a determination that neither the second pixel 132 nor the eighth pixel 144 is a weak edge candidate, the ETH module 116 may scan other pixels in the image to determine whether a strong edge candidate is present. In response to a determination that either the second pixel 132 or the eighth pixel 144 is a weak edge candidate, the ETH module 116 may identify the pixel as an edge and perform additional trace operations with respect to the pixel. For example, in response to a determination that the eighth pixel 144 is a weak edge candidate, the ETH module 116 may identify the eighth pixel 144 as an edge. Additionally the ETH module 116 may determine whether a pixel below the eighth pixel 144 (e.g., the next pixel in the negative direction) is a weak edge candidate, etc.

Scanning multiple pixels (e.g., the group of pixels) simultaneously for strong edge candidates may reduce processing time as compared to sequentially scanning each pixel one-by-one for strong edge candidates. The scanning operation for the group of pixels may be executed using a single instruction. In response to a determination that there are no strong edge candidates in the group of pixels, the ETH module 116 may scan a different group of pixels.

The ETH module 116 may be configured to initiate scanning operations (e.g., the ETH operations) on a portion of the image prior to completion of the NMS operation. For example, the NMS module 114 may perform the NMS operation on a threshold number (Z) of rows, and the ETH module 116 may initiate the ETH operation after the NMS operation on the threshold number (Z) of rows is completed.

The threshold number (Z) of rows may be based on a likelihood that the ETH module 116 will traverse a pixel in a positive row (e.g., a row below the particular pixel in which ETH operations are being performed). Table 1 illustrates the likelihood that ETH operations will be able to continue without being interrupted by NMS processing based on an amount of traverse steps.

TABLE 1

Probability of traversing Z rows

| traverse steps | probability | accumulate probability |
| --- | --- | --- |
| 0 | 71.28% | 71.28% |
| 1 | 14.35% | 85.63% |
| 2 | 7.03% | 92.66% |
| 3 | 3.34% | 96.00% |

TABLE 1-continued

Probability of traversing Z rows

| traverse steps | probability | accumulate probability |
|---|---|---|
| 4 | 1.62% | 97.62% |
| 5 | 0.86% | 98.48% |
| 6 | 0.50% | 98.98% |
| 7 | 0.29% | 99.27% |
| 8 | 0.19% | 99.46% |
| 9 | 0.12% | 99.58% |
| 10 | 0.07% | 99.66% |

As a non-limiting example, the ETH module 116 may determine that a ninety-six (96) percent probability that the ETH operations will not be stalled by NMS operations is satisfactory. In such case, the ETH module 116 may set the threshold number (Z) of rows to three rows. The threshold number of rows may be hard-coded or dynamically reconfigurable based on the image data being processed.

As an illustrative example, the NMS module 114 may perform NMS operations on the first, second, and third rows 120-124 of pixels (e.g., Z=3). Each time that the NMS module 114 completes NMS operations on a particular row, the NMS module 114 may set a row indicator bit in a row synchronization buffer of the image processor 104 to indicate to the ETH module 116 that NMS operations for the particular row are complete. After NMS operations on the third row 124 of pixels are completed (e.g., the first 3 row synchronization bits are set), the ETH module 116 may initiate ETH operations. For example, the ETH module 116 may initiate scanning a group of pixels in the first row 120 of pixels for strong edge candidates.

When the ETH module 116 has completed performing the ETH operations on the first row 120 of pixels, the ETH module 116 may poll the row synchronization buffer to determine whether NMS operations are complete for an additional row of pixels (e.g., the fourth row 126 of pixels). For example, weak edge candidate pixels in the positive direction (e.g., pixels to the right of the strong edge pixel or pixels below the strong edge pixel) that have a gradient direction perpendicular to the gradient direction of the strong edge pixel may need to undergo NMS operations prior to ETH operations continuing. Unless that gradient direction of the strong edge pixel is ninety degrees (yielding a perpendicular gradient direction of zero degrees), the ETH module 116 may stall ETH operations on the next row of pixels (e.g., the second row 122 of pixels) until the row synchronization buffer indicates that NMS operations are complete for the fourth row 126 of pixels.

In a particular aspect, the ETH module 116 may poll the row synchronization buffer to determine whether NMS operations are complete for the next line (e.g., the fourth row 126 of pixels) prior to continuing ETH operations. In response to a determination that NMS operations for the next line have been completed, the ETH module 116 may continue ETH operations on the second row 122 of pixels.

In another particular aspect, the ETH module 116 may poll a lookup table to determine an increment for the row synchronization buffer prior to continuing ETH operations. For example, the ETH module 116 may perform a lookup operation using the gradient direction of the strong edge pixel in the first row 120 of pixels, and the lookup table may output whether an additional row of pixels needs to have undergone NMS operations based on the gradient direction of the strong edge pixel. In response to an indication that an additional row of pixels needs to have undergone NMS operations, the ETH module 116 may poll the row synchronization buffer to determine whether NMS operations are complete for the fourth row 126 of pixels prior to continuing ETH operations. In response to an indication that an additional row of pixels does not need to have undergone NMS operations (e.g., the gradient direction of the strong edge pixel is ninety degrees), the ETH module 116 may continue ETH operations without polling the row synchronization buffer.

In another particular aspect, the ETH module 116 may poll the row synchronization buffer to determine whether NMS operations are complete for the remaining rows of pixels (e.g., the fourth row 126 of pixels to the $N^{th}$ row 128 of pixels). In response to a determination the NMS operation for the image have competed, the ETH module 116 may complete ETH operations without polling the row synchronization buffer.

It will be appreciated that performing NMS operations through interleaved data partition, as illustrated in FIG. 3, may further reduce Canny Filter processing times. Each thread in the first NMS thread may correspond to a particular number of rows of pixels that undergo NMS operations. For example, each thread in the first NMS thread may correspond to two rows of pixels, four rows of pixels, eight rows of pixels, etc. Performing NMS operations according to an interleaved data partition may reduce an amount of waiting time after each row of ETH operations.

Figure 4:
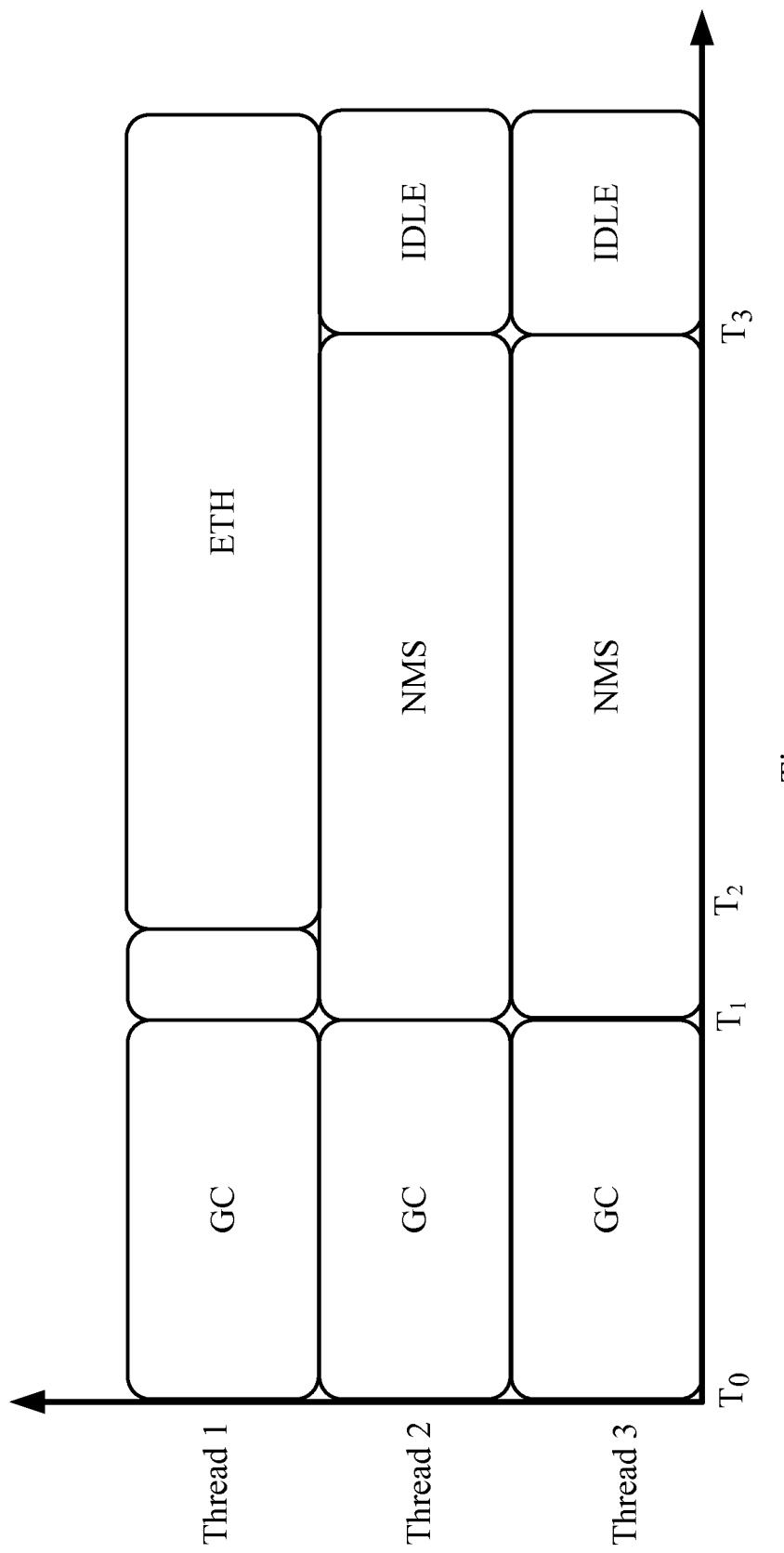
FIG. 4 is a diagram of a particular aspect of a threading pattern to increase Canny Filter implementation speed.

Referring to FIG. 4, a particular aspect of a threading pattern to increase Canny Filter implementation speed is shown. The aspect illustrated in FIG. 4 illustrates timing operations for a first thread, a second thread, and a third thread. Each thread may operate on one or more rows of pixels in the display 102 of FIG. 1. As a non-limiting example, the first thread may correspond to the first, second, and third rows 120-124 of pixels in the display 102, the second thread may correspond to the next three rows of pixels in the display 102, and the third thread may correspond to the remaining rows of pixels in the display 102.

Each thread may perform gradient computation (GC) operations between an initial time $T_0$ and a first time $T_1$. For example, the gradient magnitude (M) and gradient direction (e.g., gradient angle (θ)) for each pixel in the image may be computed during a time period spanning from the initial time $T_0$ to the first time $T_1$. At the first time $T_1$, the gradient computation operations may complete and NMS operations may begin. The first thread may perform NMS operations from the first time $T_1$ to a second time $T_2$, and the second and third threads may perform NMS operations from the first time $T_1$ to a third time $T_3$.

After the first thread has completed NMS operations (e.g., after the threshold number of rows has undergone NMS operations), the first thread may initiate ETH operations while the remaining threads continue to execute NMS operations (e.g., in an interleaved fashion). Initiating ETH operations in the first thread prior to completion of NMS operations in the remaining threads may reduce processing time and increase Canny Filter implementation speed. In one aspect, the enhanced Canny Filter module 110 may increase processing speed by up to 76.1% compared to conventional Canny Filter techniques.

Figure 5:
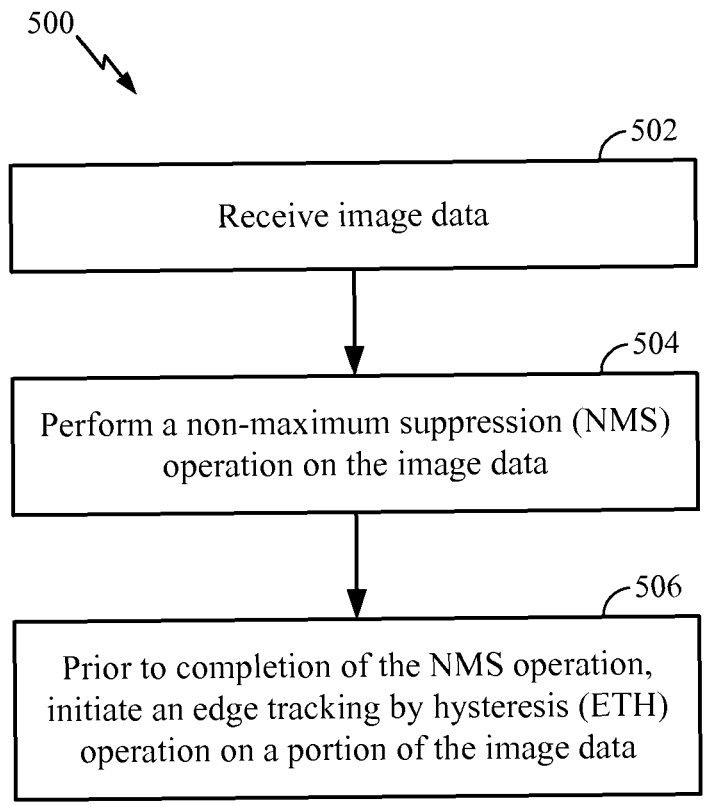
FIG. 5 is a flowchart of a particular aspect of a method of increasing Canny Filter implementation speed.

Referring to FIG. 5, a flowchart of a particular aspect of a method 500 of increasing Canny Filter implementation speed is shown. In an illustrative aspect, the method 500 may be performed using the system 100 of FIG. 1.

The method 500 includes receiving image data, at 502. For example, referring to FIG. 1, the image processor 104 may generate image data and provide the image data to the enhanced Canny Filter module 110.

A non-maximum suppression operation may be performed on the image data, at 504. For example, referring to FIG. 1, the NMS module 114 may perform a NMS operation on a particular pixel (e.g., image data) to determine whether the particular pixel is a strong edge candidate or a weak edge candidate.

An edge tracking by hysteresis operation may be initiated on a portion of the image data prior to completion of the non-maximum suppression operation, at 506. For example, referring to FIG. 1, the ETH module 116 may initiate ETH operations on a portion of the image data prior to the NMS module completing NMS operations.

The method 500 of FIG. 5 may increase Canny Filter implementation speed. For example, initiating ETH operations prior to completion of NMS operations for the image may reduce processing time and increase Canny Filter implementation speed as opposed to stalling ETH operations until NMS operations for the entire image have completed. For example, the enhanced Canny Filter module 110 may increase processing speed by up to 76.1% compared to conventional Canny Filter techniques.

Figure 6:
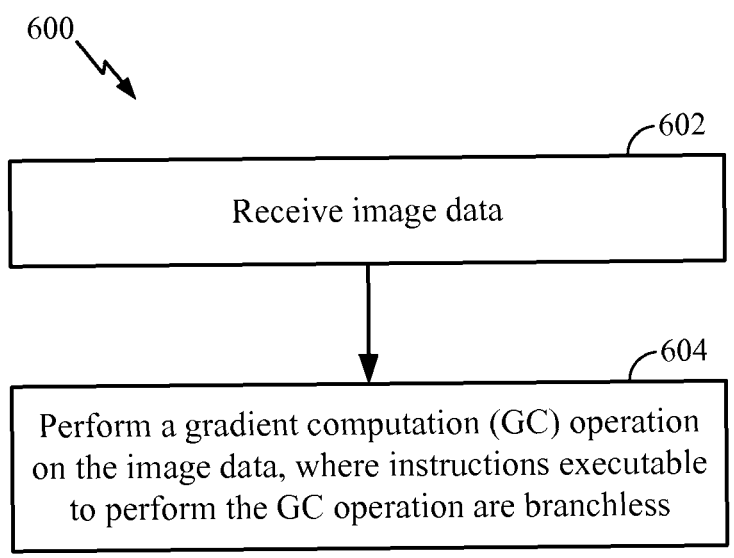
FIG. 6 is a flowchart of another particular aspect of a method of increasing Canny Filter implementation speed.

Referring to FIG. 6, a flowchart of another particular aspect of a method 600 of increasing Canny Filter implementation speed is shown. In an illustrative aspect, the method 600 may be performed using the system 100 of FIG. 1.

The method 600 may include receiving image data, at 602. For example, referring to FIG. 1, the image processor 104 may generate image data and provide the image data to the enhanced Canny Filter module 110.

A gradient computation operation may be performed on the image data, at 604. Instructions executable to perform the gradient computation operation may be branchless. For example, referring to FIG. 1, the GC module 112 may perform a gradient computation operation using branchless instructions.

The method 600 of FIG. 6 may reduce processing time associated with gradient computations. For example, as described above with reference to FIG. 1, when computing the quantized angle θ(x,y), later computations may override earlier computations to eliminate the need for branching instructions (e.g., "else if" clauses). For example, regardless of the value of the quantized angle θ(x,y) after the initial computations, if the third step determines that $D_x$ and $D_y$ are equal to zero, the GC module 112 may override the previous computations. Thus, the algorithm may include four compare (e.g., "if") operations and four multiplexing "mux" operations. It will be appreciated that two or more compare operations may be performed simultaneously (e.g., in parallel) to reduce processing time.

Figure 7:
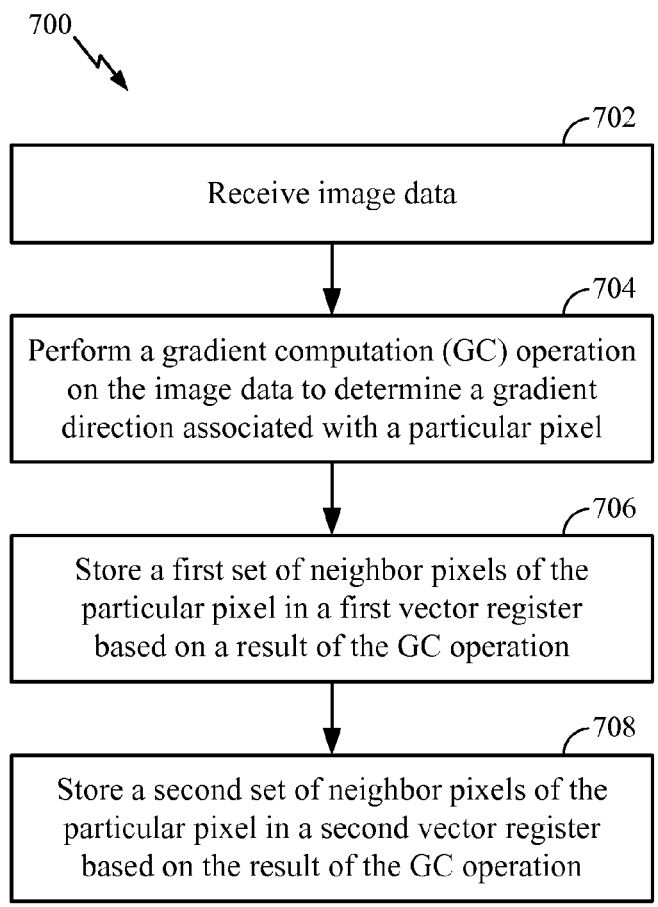
FIG. 7 is a flowchart of another particular aspect of a method of increasing Canny Filter implementation speed.

Referring to FIG. 7, a flowchart of another particular aspect of a method 700 of increasing Canny Filter implementation speed is shown. In an illustrative aspect, the method 700 may be performed using the system 100 of FIG. 1.

The method 700 may include receiving image data, at 702. For example, referring to FIG. 1, the image processor 104 may generate image data and provide the image data to the enhanced Canny Filter module 110.

A gradient computation operation may be performed on the image data to determine a gradient direction associated with a particular pixel, at 704. For example, referring to FIG. 1, the GC module 112 may perform a gradient computation operation on the image data to determine the gradient direction associated with a particular pixel.

A first set of neighbor pixels of the particular pixel may be stored in a first vector register based on a result of the gradient computation operation, at 706. For example, referring to FIG. 1, after determining the gradient direction associated with the particular pixel and its neighboring pixels, the GC module 112 may store a first set of neighbor pixels in the first vector register 150.

A second set of neighbor pixels of the particular pixel may be stored in a second vector register based on the result of the gradient computation operation, at 708. For example, referring to FIG. 1, after determining the gradient direction associated with the particular pixel and its neighboring pixels, the GC module 112 may store a second set of neighbor pixels of the fifth pixel 138 in the second vector register 152.

The method 700 of FIG. 7 may reduce processing time during NMS operations by storing each negative and positive neighboring pixels in corresponding vector registers. For example, because there are four potential neighbor candidates, four compare operations may be performed and eight "mux" operations (e.g., for the negative and positive neighbors) may be performed to determine whether a particular pixel is a strong edge candidate or a weak edge candidate. Storing each set of neighboring pixels in the vector registers enables the NMS module 114 to partition the pixels into two categories.

Figure 8:
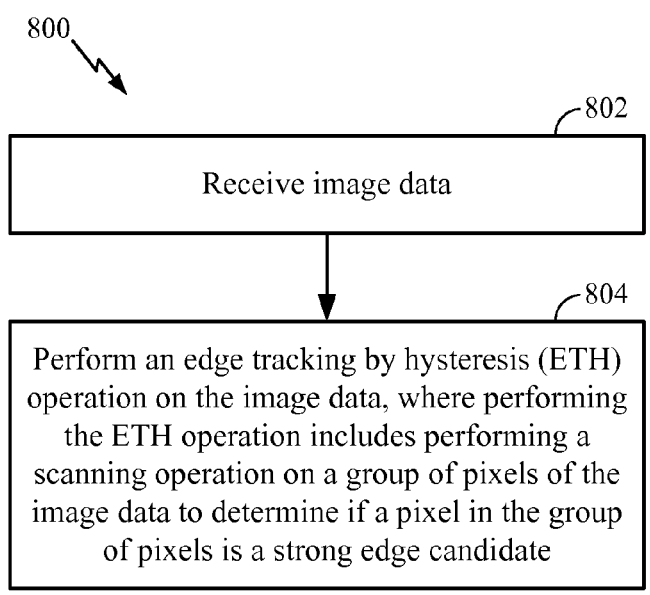
FIG. 8 is a flowchart of another particular aspect of a method of increasing Canny Filter implementation speed.

Referring to FIG. 8, a flowchart of another particular aspect of a method 800 of increasing Canny Filter implementation speed is shown. In an illustrative aspect, the method 800 may be performed using the system 100 of FIG. 1.

The method 800 may include receiving image data, at 802. For example, referring to FIG. 1, the image processor 104 may generate image data and provide the image data to the enhanced Canny Filter module 110.

An edge tracking by hysteresis operation may be performed on the image data, at 804. Performing the edge tracking by hysteresis operation may include performing a scanning operation on a group of pixels of the image data to determine if a pixel in the group of pixels is a strong edge candidate. For example, referring to FIG. 1, the ETH module 116 may perform an ETH operation on the image data.

The method 800 of FIG. 8 may reduce processing time during ETH operations. For example, scanning multiple pixels (e.g., the group of pixels) simultaneously for strong edge candidates may reduce processing time compared to sequentially scanning each pixel one-by-one for strong edge candidates. In addition, the read operation (e.g., the scanning operation) for the group of pixels may be executed using a single instruction.

Figure 9:
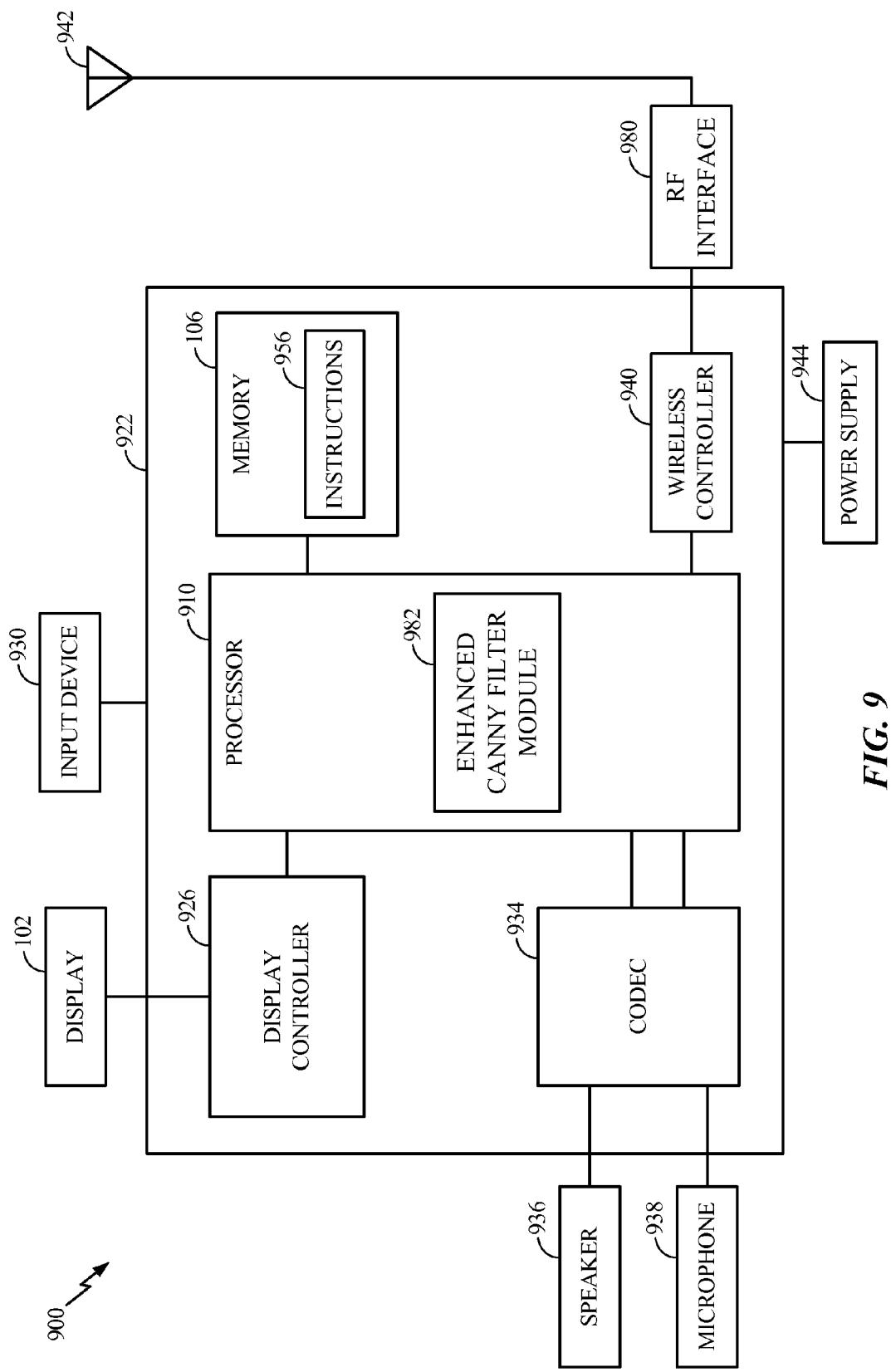
FIG. 9 is a block diagram of a wireless device including components operable to increase Canny Filter implementation speed.

Referring to FIG. 9, a block diagram of wireless device 900 including components operable to increase Canny Filter implementation speed is shown. The device 900 includes a processor 910, such as a digital signal processor (DSP), coupled to the memory 106. The processor 910 may include an enhanced Canny Filter module 982. In a particular aspect, the enhanced Canny Filter module 982 may correspond to the enhanced Canny Filter module 110 of FIG. 1. For example, the enhanced Canny Filter module 982 may include the GC module 112, the NMS module 114, and the ETH module 116. In addition, the enhanced Canny Filter module 982 may be operable to perform at least a portion of the methods 500-800 of FIGS. 5-8.

FIG. 9 also shows a display controller 926 that is coupled to the processor 910 and to the display 102. A coder/decoder (CODEC) 934 can also be coupled to the processor 910. A speaker 936 and a microphone 938 can be coupled to the CODEC 934. FIG. 9 also indicates that a wireless controller 940 can be coupled to the processor 910 and to an antenna 942 via a radio frequency (RF) interface 980.

The memory 106 may be a tangible non-transitory processor-readable storage medium that includes executable instructions 956. In a particular aspect, the instructions 956 include branchless instructions that are executable to perform gradient computation operations, as described with respect to FIG. 6. The instructions 956 may be executed by a processor, such as the processor 910 or the enhanced Canny Filter module 982 included within the processor 910. For example, the instructions 956 may be executable by the processor 910 to perform at least a portion of the methods 500-800 of FIGS. 5-8. In a particular aspect, the Canny Filter module 982 may include the instructions 956. For example, the Canny Filter module 982 may be implemented as a controller (e.g., a separate processor) that is coupled to a computer-readable medium that stores the instructions 956. The instructions 956 may be executable by the Canny Filter module 982 to receive image data, perform GC operations as described with respect to FIG. 1, perform NMS operations as described with respect to FIG. 1, and perform ETH operations as described with respect to FIG. 1. For example, the Canny Filter module 982 may include a GC module, an NMS module, and an ETH module to execute the instructions 956 to increase Canny Filter implementation speed in a similar manner as described with respect to FIG. 1.

In a particular aspect, the Canny Filter module 982 may be implemented as software that is executable by a processor, such as the processor 910. For example, the Canny Filter module 982 may correspond to instructions that are executable by the processor 910 to perform a Canny Filter operation and to increase Canny Filter implementation speed as described with respect to FIG. 1.

In a particular aspect, the processor 910, the display controller 926, the memory 932, the CODEC 934, and the wireless controller 940 are included in a system-in-package or system-on-chip device 922. In a particular aspect, an input device 930 and a power supply 944 are coupled to the system-on-chip device 922. Moreover, in a particular aspect, as illustrated in FIG. 9, the display 928, the input device 930, the speaker 936, the microphone 938, the antenna 942, and the power supply 944 are external to the system-on-chip device 922. However, each of the display 928, the input device 930, the speaker 936, the microphone 938, the antenna 942, and the power supply 944 can be coupled to a component of the system-on-chip device 922, such as an interface or a controller. Although the Canny Filter module 982 is shown in the processor 910, in other implementations, the Canny Filter module 982 may be implemented within other components of the system-on-chip device 922. As a non-limiting example, the Canny Filter module 982 may be implemented in the display controller 926.

In conjunction with the described aspects, a first apparatus is disclosed that includes means for receiving image data and means for performing a non-maximum suppression (NMS) operation on the image data. For example, the means for receiving the image data may include the display 102 of FIGS. 1 and 9, the processor 104 of FIG. 1, the enhanced Canny Filter module 110 of FIG. 1 and the components therein, the processor 910 programmed to execute the instructions 956 of FIG. 6, the enhanced Canny Filter module 980 of FIG. 9, the enhanced Canny Filter module 982 of FIG. 9, the display controller 926 of FIG. 9, one or more other devices, circuits, modules, or instructions to receive image data, or any combination thereof.

The first apparatus may also include means for initiating an edge tracking by hysteresis (ETH) operation on a portion of the image data prior to completion of the NMS operation. The means for initiating the ETH operation may include the processor 104 of FIG. 1, the enhanced Canny Filter module 110 of FIG. 1 and the components therein, the processor 910 programmed to execute the instructions 956 of FIG. 6, the enhanced Canny Filter module 980 of FIG. 9, the enhanced Canny Filter module 982 of FIG. 9, the display controller 926 of FIG. 9, one or more other devices, circuits, modules, or instructions to initiate the ETH operation, or any combination thereof.

In conjunction with the described aspects, a second apparatus is disclosed that includes means for receiving image data and means for performing a non-maximum suppression (NMS) operation on the image data. For example, the means for receiving the image data may include the display 102 of FIGS. 1 and 9, the processor 104 of FIG. 1, the enhanced Canny Filter module 110 of FIG. 1 and the components therein, the processor 910 programmed to execute the instructions 956 of FIG. 6, the enhanced Canny Filter module 980 of FIG. 9, the enhanced Canny Filter module 982 of FIG. 9, the display controller 926 of FIG. 9, one or more other devices, circuits, modules, or instructions to receive image data, or any combination thereof.

The second apparatus may also include means for performing a gradient computation (GC) operation on the image data using branchless instructions. For example, the means for performing the GC operation may include the processor 104 of FIG. 1, the enhanced Canny Filter module 110 of FIG. 1 and the components therein, the processor 910 programmed to execute the instructions 956 of FIG. 6, the enhanced Canny Filter module 980 of FIG. 9, the enhanced Canny Filter module 982 of FIG. 9, the display controller 926 of FIG. 9, one or more other devices, circuits, modules, or instructions to perform the GC operation, or any combination thereof.

In conjunction with the described aspects, a third apparatus is disclosed that includes means for receiving image data and means for performing a non-maximum suppression (NMS) operation on the image data. For example, the means for receiving the image data may include the display 102 of FIGS. 1 and 9, the processor 104 of FIG. 1, the enhanced Canny Filter module 110 of FIG. 1 and the components therein, the processor 910 programmed to execute the instructions 956 of FIG. 6, the enhanced Canny Filter module 980 of FIG. 9, the enhanced Canny Filter module 982 of FIG. 9, the display controller 926 of FIG. 9, one or more other devices, circuits, modules, or instructions to receive image data, or any combination thereof.

The third apparatus may also include means for performing a gradient computation (GC) operation on the image data to determine a gradient direction associated with a particular pixel. For example, the means for performing the GC operation may include the processor 104 of FIG. 1, the enhanced Canny Filter module 110 of FIG. 1 and the components therein, the processor 910 programmed to execute the instructions 956 of FIG. 6, the enhanced Canny Filter module 980 of FIG. 9, the enhanced Canny Filter module 982 of FIG. 9, the display controller 926 of FIG. 9, one or more other devices, circuits, modules, or instructions to perform the GC operation, or any combination thereof.

The third apparatus may also include, based on a result of the GC operation, means for storing a first set of neighbor pixels of the particular pixel in a first vector register and means for storing a second set of neighbor pixels of the particular pixel in a second vector register. For example, the means for storing may include the processor 104 of FIG. 1, the first vector register 150, the second vector register 152, the enhanced Canny Filter module 110 of FIG. 1 and the components therein, the processor 910 programmed to execute the instructions 956 of FIG. 6, the enhanced Canny Filter module 980 of FIG. 9, the enhanced Canny Filter module 982 of FIG. 9, the display controller 926 of FIG. 9, one or more other devices, circuits, modules, or instructions to store the first set of neighbor pixels and the second set of neighbor pixels, or any combination thereof.

In conjunction with the described aspects, a fourth apparatus is disclosed that includes means for receiving image data and means for performing a non-maximum suppression (NMS) operation on the image data. For example, the means for receiving the image data may include the display 102 of FIGS. 1 and 9, the processor 104 of FIG. 1, the enhanced Canny Filter module 110 of FIG. 1 and the components therein, the processor 910 programmed to execute the instructions 956 of FIG. 6, the enhanced Canny Filter module 980 of FIG. 9, the enhanced Canny Filter module 982 of FIG. 9, the display controller 926 of FIG. 9, one or more other devices, circuits, modules, or instructions to receive image data, or any combination thereof.

The fourth apparatus may also include means for performing an edge tracking by hysteresis (ETH) operation on the image data. Performing the ETH operation may include performing a scanning operation on a group of pixels of the image data to determine if a pixel in the group of pixels is a strong edge candidate. For example, the means for performing the ETH operation may include the processor 104 of FIG. 1, the enhanced Canny Filter module 110 of FIG. 1 and the components therein, the processor 910 programmed to execute the instructions 956 of FIG. 6, the enhanced Canny Filter module 980 of FIG. 9, the enhanced Canny Filter module 982 of FIG. 9, the display controller 926 of FIG. 9, one or more other devices, circuits, modules, or instructions to perform the ETH operation, or any combination thereof.

Those of skill would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method comprising:
 receiving image data;
 performing a non-maximum suppression operation on a first portion of the image data;
 initiating an edge tracking by hysteresis operation on the first portion of the image data before the non-maximum suppression operation is performed on a second portion of the image data;
 polling a memory location prior to performing the edge tracking by hysteresis operation on the second portion of the image data, the memory location storing a value indicative of whether the non-maximum suppression operation has been performed on the second portion of the image data; and
 performing the edge tracking by hysteresis operation on the second portion of the image data in response to a determination that the value stored at the memory location is set at a particular value.

2. The method of claim 1, wherein the edge tracking by hysteresis operation is initiated on the first portion after the non-maximum suppression operation on the first portion is completed.

3. The method of claim 1, wherein the memory location is polled after performing the edge tracking by hysteresis operation on the first portion of the image data.

4. The method of claim 1, wherein the non-maximum suppression operation is performed on a plurality of portions of the image data according to an interleaved data partition pattern.

5. The method of claim 1, wherein the memory location is polled after performing the edge tracking by hysteresis operation on the first portion of the image data; and further comprising:
 performing the edge tracking by hysteresis operation on an additional portion of the image data without additionally polling the memory location in response to a determination to not perform that the non-maximum suppression operation on the additional portion.

6. The method of claim 1, wherein the memory location is included in a row synchronization buffer, and wherein the first portion comprises at least a first row of one or more rows and the second portion comprises at least a next row of the one or more rows.

7. The method of claim 1, wherein the image data corresponds to a still image or a frame of video.

8. The method of claim 1, wherein initiating the edge tracking by hysteresis operation comprises performing a scanning operation on a group of pixels to determine whether a pixel in the group of pixels is a strong edge candidate.

9. The method of claim 8, further comprising performing the scanning operation on a different group of pixels in response to a determination that there is not a pixel in the group of pixels that is a strong edge candidate.

10. The method of claim 8, further comprising, in response to a determination that a particular pixel in the group of pixels is a strong edge candidate, performing an edge tracking operation.

11. The method of claim 1, further comprising:
performing a gradient computation operation on the image data to determine a gradient direction associated with a particular pixel; and
based on a result of the gradient computation operation:
storing a first set of neighbor pixels of the particular pixel in a first vector register; and
storing a second set of neighbor pixels of the particular pixel in a second vector register.

12. The method of claim 11, further comprising performing the gradient computation operation by executing branchless instructions.

13. The method of claim 11, wherein the first set of neighbor pixels includes positive neighbors, and wherein the second set of neighbor pixels includes negative neighbors.

14. The method of claim 13, wherein performing the non-maximum suppression operations comprises determining whether the particular pixel is a strong edge candidate based on the positive neighbors and the negative neighbors.

15. An apparatus comprising:
an image processor; and
a memory storing instructions that are executable by the image processor to perform operations comprising:
receiving image data;
performing a non-maximum suppression operation on a first portion of the image data; and
initiating an edge tracking by hysteresis operation on the first portion of the image data before the non-maximum suppression operation is performed on a second portion of the image data;
polling a memory location prior to performing the edge tracking by hysteresis operation on the second portion of the image data, the memory location storing a value indicative of whether the non-maximum suppression operation has been performed on the second portion of the image data; and
performing the edge tracking by hysteresis operation on the second portion of the image data in response to a determination that the value stored at the memory location is set at a particular value.

16. The apparatus of claim 15, wherein initiating the edge tracking by hysteresis operation comprises performing a scanning operation on a group of pixels to determine whether a pixel in the group of pixels is a strong edge candidate.

17. The apparatus of claim 15, wherein the operations further comprise:
performing a gradient computation operation on the image data to determine a gradient direction associated with a particular pixel; and
based on a result of the gradient computation operation:
storing a first set of neighbor pixels of the particular pixel in a first vector register; and
storing a second set of neighbor pixels of the particular pixel in a second vector register.

18. A non-transitory computer-readable medium comprising instructions that, when executed by an image processor, cause the image processor to:
receive image data;
perform a non-maximum suppression operation on a first portion of the image data; and
initiate an edge tracking by hysteresis operation on the first portion of the image data before the non-maximum suppression operation is performed on a second portion of the image data;
poll a memory location prior to performing the edge tracking by hysteresis operation on the second portion of the image data, the memory location storing a value indicative of whether the non-maximum suppression operation has been performed on the second portion of the image data; and
perform the edge tracking by hysteresis operation on the second portion of the image data in response to a determination that the value stored at the memory location is set at a particular value.

19. The non-transitory computer-readable medium of claim 18, wherein initiating the edge tracking by hysteresis operation comprises performing a scanning operation on a group of pixels to determine whether a pixel in the group of pixels is a strong edge candidate.

20. The non-transitory computer-readable medium of claim 18, wherein the instructions are further executable by the image processor to:
perform a gradient computation operation on the image data to determine a gradient direction associated with a particular pixel; and
based on a result of the gradient computation operation:
store a first set of neighbor pixels of the particular pixel in a first vector register; and
store a second set of neighbor pixels of the particular pixel in a second vector register.

* * * * *